Aug. 25, 1936. D. D. J. C. C. COLAERT 2,052,448
DEVICE FOR MANUFACTURING ELASTIC JOINTS
Filed Oct. 23, 1935 2 Sheets-Sheet 1
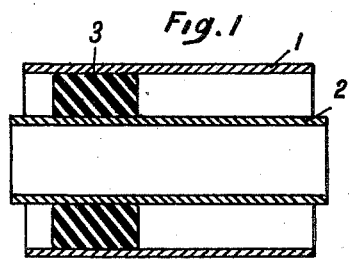
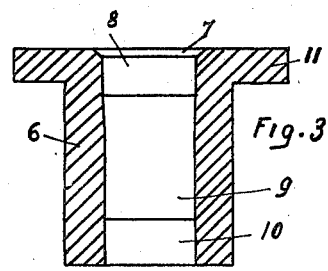
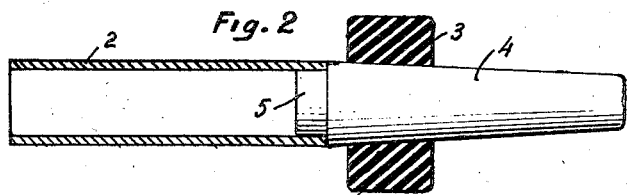
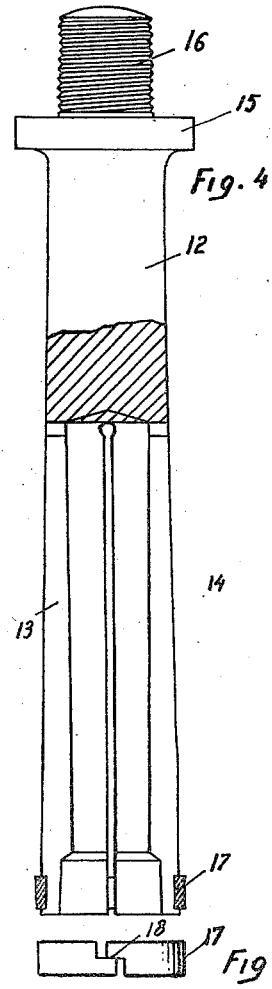
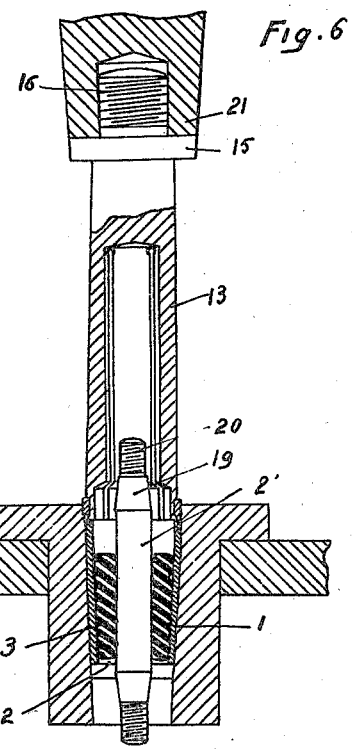
D. D. J. C. C. Colaert
INVENTOR Aug. 25, 1936.        D. D. J. C. C. COLAERT        2,052,448
DEVICE FOR MANUFACTURING ELASTIC JOINTS
Filed Oct. 23, 1935        2 Sheets-Sheet 2
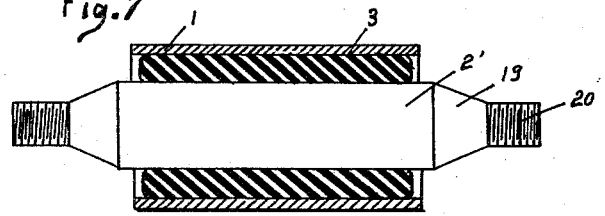
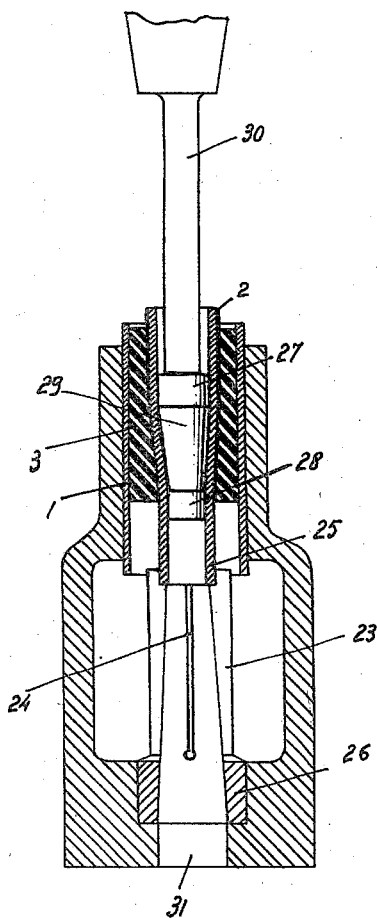

Patented Aug. 25, 1936

2,052,448

UNITED STATES PATENT OFFICE 2,052,448

DEVICE FOR MANUFACTURING ELASTIC JOINTS

Daniel Dominique Joseph Charles Corneille Colaert, Hazebrouck, France

Application October 23, 1935, Serial No. 46,239½
In France November 8, 1934

7 Claims. (Cl. 205—4)

This invention is relative to a device for manufacturing elastic joints, constituted by two concentric metal muffs (or by an axle surrounded by a muff) between which is inserted a rubber ring, which is strongly compressed in a manner to adhere to the surfaces of both said muffs and to be presented from sliding.

Among the known methods of manufacturing joints of the described kind, some consist in inserting by force between the two concentric muffs a rubber ring, the thickness of which is greater than the annular space existing between said muffs. Such an insertion is obviously however very difficult to perform. In order to obviate this difficulty, it has been suggested to force the rubber ring onto the inner muff then to draw it out in axial direction until its outer diameter is sufficiently reduced to permit the outer muff to be mounted with but small friction, and finally to let the rubber ring loose.

A second method, which naturally comes to mind consists in using a rubber ring, the thickness of which practically does not exceed the annular space comprised between the two metal muffs, so that it may be introduced therein with but small or even without any compression, and to perform its strong compression but subsequently, either by reducing the diameter of the outer muff, or by extending that of the inner muff. Such reduction of the diameter of the outer muff was effected however by means of special raising in machines, this being a fairly long and delicate operation, in which a regular radial compression of the rubber ring is difficult to obtain.

It has also been suggested to reduce the diameter of the outer muff by drawing it out, but this discloses the drawbacks of increasing the length of said muff and diminishing its thickness, consequently reducing its strength, on one hand, and on the other, of causing considerable waste of material, as the drawn out ends of the muff must be cut off and go to scrap.

Object of this invention is to provide a device for performing the second of the hereinafter mentioned methods while avoiding the drawbacks of raising in or drawing out one of the metal muffs of the joint; this device is characterized in that it comprises two members, one of which is fixed and the other movable, and that one of said members is conically shaped and adapted to modify the diameter of one of the metal muffs of the joint, whereas the other member is elastically deformable in diametral direction in a manner to follow the progressive deformation of the diameter of the deformed metal muff.

This device discloses, amongst other advantages that of providing the outer metal muff with a very great hardness and elastic limit, which could not be produced by any thermic treatment, which is moreover inapplicable in the present instance.

Two embodiments of the device object of the invention are hereinafter described, by way of examples, with reference to the accompanying drawings:

Fig. 1 is an axial sectional view of the joint in its initial state.

Fig. 2 illustrates the first phase of its manufacturing.

Fig. 3 is an elevation sectional view of the conically shaped member of the device;

Fig. 4 is a similar view of a push-member for pushing the joint through the conically shaped member.

Fig. 5 is a view of a detail of said push-member.

Fig. 6 illustrates the device in work;

Fig. 7 shows the finished joint;

Fig. 8 illustrates a second embodiment of the device according to invention, which extends the diameter of the inner muff or the joint.

Fig. 1 illustrates, in longitudinal section, the three members forming the joint, which are adapted to be set into position without any difficulty before the beginning of the operation. The outer not yet deformed metal muff is shown in 1, the also not deformed rubber ring in 3, and the inner member of the joint, which may be constituted by a hollow muff, or, if so desired, by a full axle, terminated for instance by conical, cylindrical or square heads, and a threading, etc., is shown in 2.

The setting of the rubber ring on the smaller muff may be facilitated, as shown in Fig. 2, by means of a device known per se, such as a conically shaped member 4, provided with a cylindrical portion 5, which fits into the bore of the tube 2 and forms a gentle slope, on which may slide the rubber ring 3 when it is too narrow, so as to reach the outer diameter of the small muff 2, this cone is withdrawn after the ring is set into position.

The dimensions of the metal muff 1, as well as those of the elastic ring 3 are calculated in a manner that the muff 1 after having been deformed in the device object of the invention should have the exact predetermined final dimensions, and that the rubber ring should at that time have reached the desired degree of radial compression.

The device permitting to deform the outer muff 1 of the joint comprises essentially a die 6 (Fig. 3), the bore of which is formed:

(a) by a short conical entry 7
(b) by a cylindrical portion 8
(c) by a long conical portion 9, and
(d) by a cylindrical portion 10.

The diameter of the cylindrical portion 8 is equal to that of the outer metal muff 1 (Fig. 1) with allowances permitting the muff to slide vertically therein without play. The dimensions of the cylindrical portion 10 are equal to the desired final dimensions of said muff 1. These two cylindrical portions are connected by an intermediate truncated portion 9, which is sufficiently long to provide a gently sloped connection between the bores 8 and 10. The slope is of about 5 to 7% to the diameter, and the length of the bores 8 and 10 is equal at least to one third of the length of the outer muff of the joint.

The inner surface of the die is converted, tempered and rectified by grinding according to the degree of precision which is necessary for the finished joint. The body of the die 6 is provided with a bearing 11, which enables it to be fixed in the mortise of a press frame.

The push-member for forcing the joint through the die 6 is constituted (Fig. 4) by a steel rod 12, provided at its end with a slightly conical tubular portion 13 which is slotted according to two diametral planes perpendicular to one another, so as to form four slots such as 14. This tubular portion 13 of the push-member is slightly conically shaped, its diameter increasing downwards. The upper end of the push-member is provided with a screw-threaded head 15 and a bearing 16, which enable said member to be fixed onto the movable member of a press or of any other device, adapted to produce a thrust in a direction perpendicular to the frame in which is fixed the die. In a circular groove of rectangular section provided in the lower portion of the push-member, is located without play a ring 17 in bronze or any other soft metal or alloy. This ring, illustrated in Fig. 5, carries a sliding articulation 18, enabling it to widen or to shrink during the operation.

The outer diameter D of the ring 17 is equal to that of the bore 8 of the die 6, and the total width of the four slots 14 of the push-member 13 is equal to at least the difference between the lengths of the circumferences 8 and 10 of the die.

Fig. 6 illustrates in way of manufacture a joint, the inner member of which is constituted by an axle 2', with conical heads 19 and screw threaded portions 20, instead of being a tube. The rubber ring having been set into position between the members 1 and 2', as illustrated in Fig. 1, adjacent to the end of these members, the joint is inserted vertically by hand into the die 6, by its end on which is set the rubber ring 3. The press is then set into action, and its movable portion 21 is lowered together with the elastic push-member screwed therein. The end of the push-member bears against the outer tube 1, and forces it through the conical portion 9 of the die 6, the elastic slotted tube 13 being deformed while passing through said die. The outer circumference of the muff 1 is therefore forced to decrease progressively according to the cone 9, until it reaches the diameter of the cylindrical portion 10 of the die. As the length of the muff, during said forced reduction of its outer diameter is unable to increase, because of the continuous thrust of the elastic member 13 on the metal, the thickness of said muff is forcibly increased, and its original internal diameter (Fig. 1) reduced by:

(1°) the difference between the diameters of the bores 8 and 10 of the die.

(2°) by a quantity resulting from the additional thickness acquired by the outer metal muff at its exit from the die.

When the elastic push-member 13 passes through the cone 9 its slotted conical portion shrinks under the action of the bronze ring 17, which, owing to its sliding articulation, adapts itself exactly to the ever decreasing circumferences of the conical portion of the die, and the original width of the slots 14 (Fig. 4) is reduced to zero. The bronze ring 17 discloses the advantage of not impairing the inner surface of the die and of being easily replaced when worn out. There is no need for this ring to be elastic, as when passing through the die it is forced to shrink by the conical portion of same, and as outside the die it is forced to open by the elasticity of the conical portion of the push-member 13.

The annular space comprised between the metal muffs 1 and 2 is thus reduced during the operation while passing through the die so that the elastic ring 3, the outer diameter of which has been progressively reduced, has also been drawn out (Fig. 6) and finally fills up entirely the final annular space. The finished joint has the aspect illustrated in Fig. 7 the rubber being everywhere uniformly compressed in radial direction. When the outer muff 1 engages at the start of the operation, in the conical portion of the die, the elastic ring 3, which is immediately deformed starting from its face 22 (Fig. 6) adheres owing to its compression sufficiently to the two muffs, so as not to be able to slide backwards.

The difference between the inner diameters of the muff 1, before and after the operation, is proportional to the desired deformation of the rubber ring 3, and varies according to the intended use of the joint. By setting the final dimensions of the outer muff, the volume of which is:

$$V = \pi L (R^2 - r^2)$$

it is easy to determine the dimensions of said muff before the operation, as the volumes remain the same, and the length L does not change. Therefore:

$$\pi L (R^2 - r^2) = \pi L (R^2_1 - r^2_1) = V$$

$R_1$ and $r_1$ being the radii of the muff 1 before the operation, R and r the radii of the same muff after the operation, and L its length. Therefore:

$$R_1 = \sqrt{\frac{V}{\pi L} \times r^2_1}$$

and $r_1$ is equal to the radius of the finished muff, increased by the difference between the "primitive" and "final" radii of the rubber ring, as it is this difference which determines its degree of compression.

The described operation results in the hammer-hardening of the metal of the deformed muff, the mechanical characteristics of hardness and elasticity of which are thus increased. Moreover, the joint is expelled from the apparatus at its desired final dimensions with a precision of 1/100 of a millimetre, without having to be corrected and the outer surface of the muff 1 being fully polished and without any marks.

For joints of small resistance, that is to say for such the diameter of the outer muff of which is but weakly reduced, say by 2 mm. one single operation may suffice. When placing the three members (Fig. 1) the two metal muffs 1 and 2 and the rubber ring 3 should be set in respect to one another, allowing for the recoil motion of the two latter members, which varies with the reduction of the diameter when passing through the die. In the case, however, of joints, with strong radial and axial resistance, that is to say of such, where it is necessary to produce a considerable deformation of the rubber, the joint should be forced through two or a multiple number of two dies of successively decreasing bore diameters. The rubber ring 3 is then placed between the two metal muffs on their middle portion, and at each subsequent passing through a die, the joint is turned over, so that the end entering into the subsequent die should be that which came out last out of the preceeding die.

The joint passes through dies of ever smaller diameter, the second die termed "intermediate die" being provided with an entrance bore of a diameter equal to that of the exit bore of the first die, termed "rough-ing down die", the entrance bore of the third die being equal to the exit bore of the second, etc.

Another embodiment of the device according to invention, but which may be used only for such joints, the inner member of which is constituted by a hollow tube, is illustrated in Fig. 8 of the accompanying drawings.

A tubular elastic buffer 23, provided with slots 24, similar to the elastic push member 13, but provided at 25 with a recess, is mounted inside a guiding frame 26, and in said recess is placed a joint as shown in Fig. 1. A mandrel formed by two cylindrical portions 27 and 28, connected by a conical portion 29, is pushed down vertically by the movable member of a press 30. When passing through the muff 2, the mandrel deforms it by increasing its inner and outer diameters. It is clear that the annular space between the two muffs is reduced and is filled up by the compressed elastic mass of the ring 3.

This embodiment requires more time, as after each operation, the mandrel must be retrieved and placed at the entry of the muff 2, whereas it is expelled from the apparatus through the aperture 31.

The mandrel may be replaced by a simple ball, the operation remaining the same. The inner tube may also be progressively extended by using mandrels or balls of ever increasing diameters.

What I claim is:

1. Device for manufacturing elastic joints of the kind comprising a cylindrical metal inner member, an outer metal muff concentric with said inner member, and an elastic ring compressed between said metal members, said device comprising a conical member adapted to modify the diameter of one of the metal members of the joint, a diametrically elastic member, one of said members being fixed and another being movable along its axis, means for forcing said elastic member to follow the variations of the diameter of the deformed member of the joint.

2. Device for manufacturing elastic joints of the kind comprising a cylindrical metal inner member, an outer metal muff concentric with said inner member, and an elastic ring compressed between said metal members, said device comprising a fixed conical member adapted to modify the diameter of the outer metal muff of the joint, a diametrically elastic member movable along the produced axis of the cone of said first member, means for forcing by said elastic member the outer member of the joint throughout said fixed conical member.

3. Device for manufacturing elastic joints of the kind comprising a cylindrical metal inner member, an outer metal muff concentric with said inner member, and an elastic ring compressed between said metal members, said device comprising a movable conical member adapted to modify the diameter of the inner member of the joint a diametrically elastic member fixed in the produced axis of the cone of said first member means for forcing said conical member throughout the inner muff of the joint, means for supporting said inner member of the joint by said elastic member.

4. Device for manufacturing elastic joints of the kind comprising a cylindrical metal inner member, an outer metal muff concentric with said inner member, and an elastic ring compressed between said metal members, said device comprising a fixed conical die adapted to modify the diameter of the outer metal member of the joint, a metal rod adapted to move coaxially to said die and to drive the joint through said die, a tubular conical portion at the end of said rod, said tubular portion provided with slots and also having a circular groove of rectangular section, and a metal friction ring in said groove and provided with a slidable articulation.

5. Device for manufacturing elastic joints of the kind comprising a cylindrical metal inner member, an outer metal muff concentric with said inner member, and an elastic ring compressed between said metal members, said device comprising a fixed die adapted to modify the diameter of the outer muff of the joint, said die comprising a short conical entrance, a cylindrical portion of a diameter equal to the original diameter of said outer muff, a cylindrical exit portion of a diameter equal to the final desired diameter of the joint, a conical portion connecting said two cylindrical portions, a metal rod adapted to move coaxially to said die and to drive the joint through said die, a tubular conical portion provided at the bottom of said rod, said tubular portion having slots and provided with a circular groove of rectangular section, and a metal friction ring in said groove and provided with a slidable articulation.

6. Device for manufacturing elastic joints of the kind comprising a cylindrical metal inner member, an outer metal muff concentric with said inner member, and an elastic ring compressed between said metal members, said device comprising a movable conical member adapted to modify the diameter of the inner member of the joint, a fixed conical tube mounted coaxially with said conical member, said tube having slots extending along its generating lines and also having a recess adapted to receive the end of the inner member of the joint.

7. Device for manufacturing elastic joints of the kind comprising a cylindrical metal inner member, an outer metal muff concentric with said inner member, and an elastic ring compressed between said metal members, said device comprising a movable mandrel adapted to modify the diameter of the inner muff of the joint, said mandrel comprising a cylindrical portion of a diameter equal to the original diameter of the inner muff, a cylindrical portion of a diameter equal to the final desired diameter of said inner muff, and a conical portion connecting said two cylindrical portions, a fixed conical tube mounted coaxially with said conical member, said tube having slots extending along its generating lines, and also having a recess adapted to receive the end of the inner member of the joint.

DANIEL DOMINIQUE JOSEPH
CHARLES CORNEILLE COLAERT.